Dec. 22, 1970    J. M. STANLEY    3,548,466
MAKING PIPE

Filed Feb. 26, 1968    2 Sheets-Sheet 1

Inventor:
John M. Stanley

By:

Dec. 22, 1970          J. M. STANLEY          3,548,466
                         MAKING PIPE
Filed Feb. 26, 1968                        2 Sheets-Sheet 2
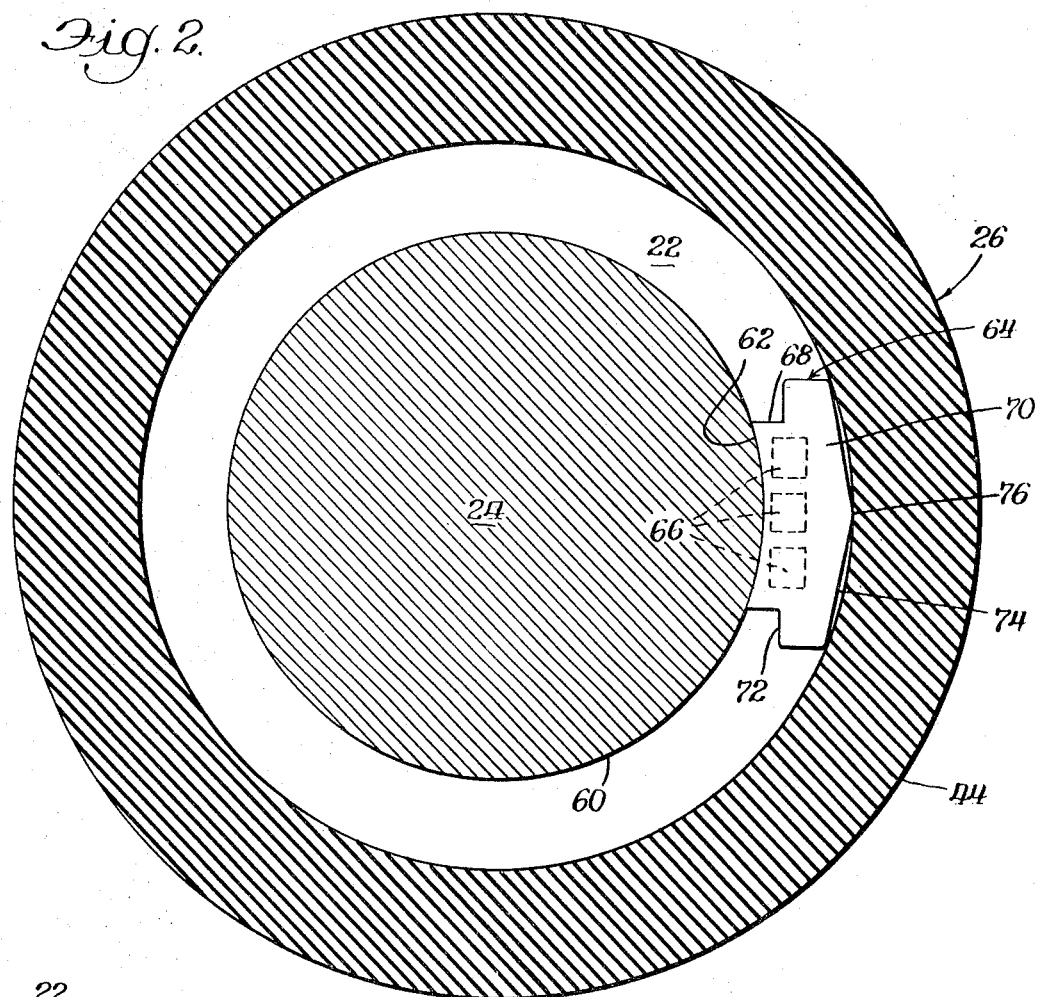
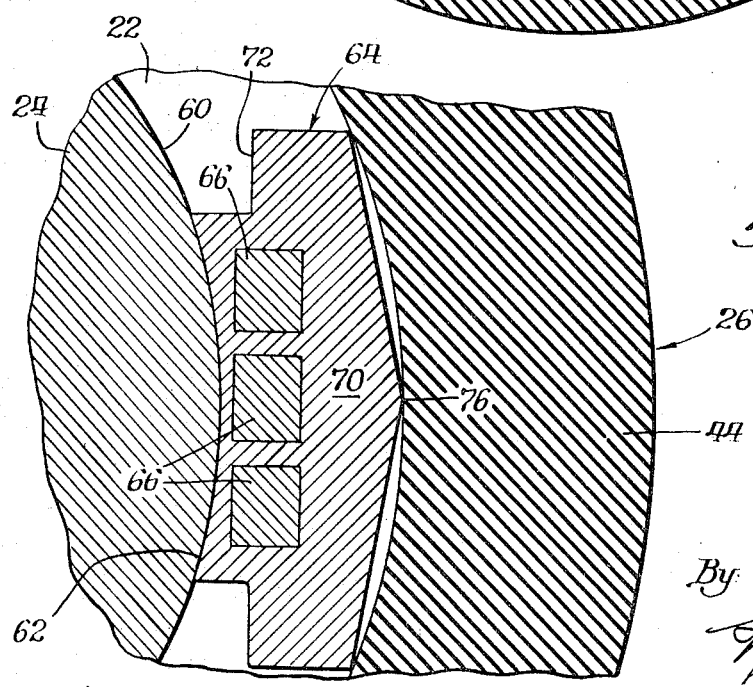
Inventor:
John M. Stanley
By

United States Patent Office

3,548,466
Patented Dec. 22, 1970

3,548,466
MAKING PIPE
John M. Stanley, Milledgeville, Ga., assignor to Amsted Industries Incorporated, Chicago, Ill., a corporation of Delaware
Filed Feb. 26, 1968, Ser. No. 708,189
Int. Cl. B28b *21/36*
U.S. Cl. 25—31                                    4 Claims

ABSTRACT OF THE DISCLOSURE

This disclosure relates to making pipe having a monolithic spur from a compressible mass of moldable material such as granular clay particles. The mandrel of an isostatic press is provided with a second mandrel removably attached to the first-mentioned mandrel and having the configuration of the interior of the spur.

---

It has been suggested in U.S. Pat. No. 3,193,900 that vitrified clay pipe be produced by pressing granular clay particles about a central mandrel. The method and apparatus disclosed therein has been used commercially to produce lengths of clay pipe. Because of the construction of the equipment, it was thought to be impossible to use the same to produce clay pipe with an integral or monolithic spur.

It is, therefore, an object of this invention to provide an apparatus for making clay pipe with a monolithic spur.

Another object of this invention is to produce a monolithic spur on a length of clay pipe in an isostatic press.

A further object of this invention is to provide an efficient apparatus for making clay pipe with an integral spur from granular clay particles.

These and other objects and advantages will become apparent from a reading of the following detailed description of this invention when taken in conjunction with the drawings wherein:

FIG. 2 is a view along the plane of line 2—2 of FIG. 1; and

FIG. 3 is an enlarged view of a portion of the apparatus of this invention.

Figure 1:
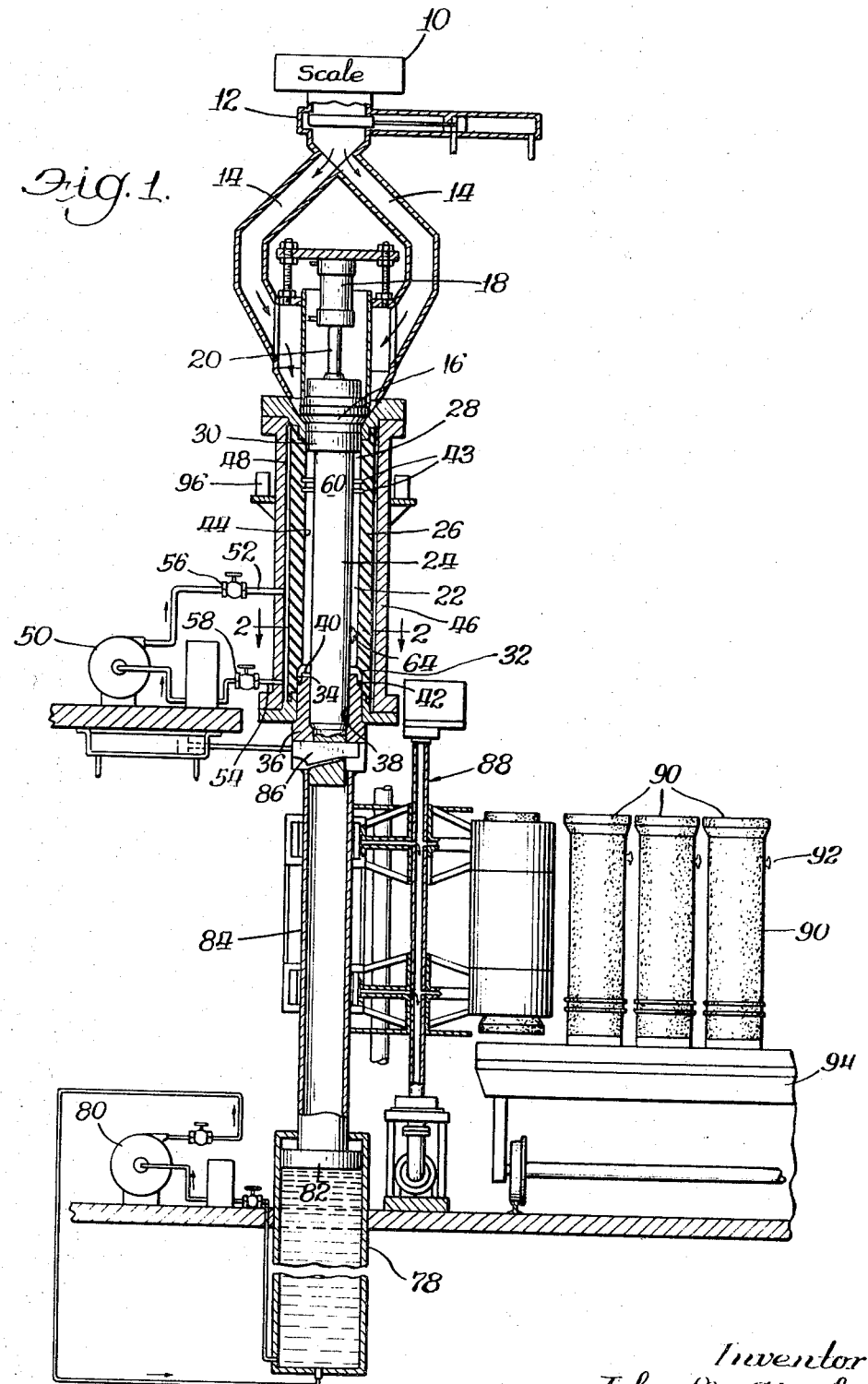
FIG. 1 is a cross-sectional view in elevation of the apparatus of this invention.

Referring now to FIG. 1, reference numeral 10 denotes a scale for the weighing of the granular clay particles. After the correct amount of clay particles have been accumulated on the scale, the hopper control valve 12 is actuated to permit the clay to fall from the scale and to be directed downwardly into the compression chamber of the conventional isostatic pressing equipment through feed lines 14. Entry of the clay particles into the compression chamber 22 is controlled by a feed valve 16 which is actuated by a hydraulic cylinder 18 which moves a rod 20 attached to the valve 16.

The compression chamber 22 is defined as the space between a central cylindrical mandrel 24 and an elastomeric sleeve 26 surrounding and spaced from the mandrel 24. The upper end 28 of the compression chamber 22 is closed by a steel ring 30 attached to the feed valve 16. The elastomeric sleeve 26 is formed from suitable elastomeric materials such as rubber or polyvinyl chloride.

The bottom of the compression chamber 22 is closed by structure forming the bell end of the clay pipe. The inner portion of the elastomeric sleeve 26 flows outwardly at 32 to form a recess 34. An end member 36, which is circular, has a central bore 38 which slideably receives the mandrel 24 and has a rim 40 which extends into the bell-shaped recess 34 to enlarge the diameter of the mandrel 24 in this area. The bottom of the recess 34 is sealed by an elastomeric ring 42 which is supported on the end member 36.

The upper portion of the elastomeric sleeve 26 is provided with axially spaced, internal annular grooves 43 which serve to provide annular ribs on the finished pipe near the end which is remote from the bell. The space between these ribs is utilized to receive a sealing gasket in the conventional manner. The wall 44 of the elastomeric sleeve 26 should have sufficient and uniform thickness and rigidity to compress the pipe to a uniform thickness with a smooth outer surface. The thickness of the wall 44 is greater than the radial dimension of the compression chamber 22.

A metal cylinder 46 surrounds and is spaced from the elastomeric sleeve 26 to provide therebetween a hydraulic fluid chamber 48. Hydraulic fluid under pressure is received from a pump 50 by means of an inlet pipe 52, mounted in the wall of the metal cylinder 46, and an outlet pipe 54. Control of the application and release of pressure is by means of a control valve 56 in pipe 52 and a control valve 58 in pipe 54.

Referring now to FIGS. 2 and 3, the mandrel 24 is provided with a cylindrical outer surface 60 of substantially the inner diameter of the pipe to be formed in this equipment. A second or spur mandrel 64 is secured to the outer surface 60 of the mandrel 24 by magnets 66. The mandrel 64 is located on the surface 60 corresponding to the location of a spur on the clay pipe.

The spur mandrel 64 consists of an integrally formed base portion 68 and a head portion 70. The base portion 68 is cylindrical in configuration and its diameter conforms to substantially the inner diameter of the leg portion of the pipe spur. The face 62 of the base portion 68 is of concave configuration to correspond to the surface 60 of the mandrel 24. The head portion 70 of the spur mandrel is also cylindrical but of a greater diameter than the diameter of the base portion 68 so as to provide therebetween a shoulder portion 72. The face 74 of the head portion 70 is conical in configuration. It should be understood that the face portion 74 may assume other configurations. The shoulder portion 72 and the head portion 70 of the spur mandrel 64 conform substantially to the configuration of the interior of the bell portion of the spur. The central portion 76 of the face 74 is preferably in contact with the wall 44 of the elastomeric sleeve 26 when the spur mandrel 64 is assembled to the surface 60 of the mandrel 24. The configuration of the spur mandrel 64, as shown in FIGS. 2 and 3, is the preferred embodiment. It should be understood that other configurations may be utilized in this invention with equal facility.

Elevator mechanism is provided to remove the formed clay pipe and mandrel 64 from the elastomeric sleeve 26. It consists of a hydraulic cylinder 78 whose fluid pressures are controlled in the conventional manner by a pump 80. A piston 82 may be raised or lowered in the cylinder 78 in response to the pressure in the cylinder. A piston rod 84 is secured at its lower end to the piston 82 and at its upper end to the end member 36 supporting the mandrel 24. A locking member 86 may be utilized to assist in holding the end member 36 in its proper position.

Conventional pipe handling apparatus indicated generally at 88 is utilized to transfer the formed pipe 90 with monolithic spur 92 to the bed of a kiln car 94. Inasmuch as this equipment is well known to those skilled in the art and it forms no part of this invention, no further description is believed necessary. A description of this apparatus may be found in the above-identified patent.

In operation, the apparatus of this invention is placed in the position as shown in FIG. 1 except the valve 16 is in its raised position. The pump 80 is started to apply pressure to the piston 82 to retain it in the position shown in FIG. 1. Granular clay particles (not shown) are accumulated on the scale 10 until the desired amount has been obtained. The hopper control valve 12 is opened to permit the clay to fall downwardly through the feed lines 14 into the compression chamber 22. In the preferred embodiment vibrators 96 are utilized to insure that the clay particles are vibrated down to completely pack the compression chamber 22.

The feed valve 16 is then closed thereby closing the upper end of the compression chamber 22 by sliding into place the ring 30. A vacuum is then applied to the compression chamber 22 by vacuum means (not shown) to remove substantially all of the air from the chamber. Preferably the vacuum is not less than 26″ Hg. The pump 50 is started to supply hydraulic pressure to the hydraulic fluid chamber 48 surrounding the elastomeric sleeve 26. The hydraulic pressure deforms the sleeve 26 to compress the clay particles around the central mandrel 24 and the spur mandrel 64 in the conventional method of isostatic pressing of clay pipe. After an interval long enough to form the clay pipe 90 under the applied pressure, the pressure is relieved.

The pressure in hydraulic cylinder 78 is relieved in order that the piston 82 and piston rod 84 may be lowered. This results in the lowering of the end member 36, the mandrel 64 and the formed pipe from the compression chamber 22 in which the mandrel 24 remains in place. The piston rod 84 will be lowered until the formed pipe reaches the pipe handling apparatus 88 at which point it will stop. The spur mandrel 64 may be slipped out of the spur of the formed pipe which pipe is then grasped by the handling apparatus 88. Thereafter, the pipe is transferred to the kiln car 94 in the conventional manner. The pipe may then be transferred to the kiln for firing in the conventional manner.

The pipe 90 made by this apparatus is formed with the integral or monolithic spur 92 in one operation, rather than in the conventional two step operation. The conventional method is to first form the pipe and then cut a hole in the wall of the pipe and attach a spur to the opening. The joint between the spur and pipe may develop cracks whereas the pipe made by this invention will not develop cracks in normal usage.

It can be seen from the foregoing that this apparatus will produce a superior product. It should be understood that various modifications may be made in this apparatus without departing from the spirit and scope of this invention.

What is claimed is:

1. Apparatus for making clay pipe having a monolithic spur from granular clay particles comprising an upright mandrel having a cylindrical outer surface, a second mandrel removably affixed to the outer surface of said upright mandrel, said second mandrel having an external configuration of substantially the internal configuration of the spur, an upright elastomeric sleeve encircling said mandrels and having a cylindrical bore extending to the lower end of said sleeve to define, in conjunction with said mandrels, a cavity conforming to the shape of the clay pipe, the lower end of said sleeve having an internal recess, means for filling the cavity, means for sealing the cavity comprising means extending into the recess, hydraulic means for contracting the elastomeric sleeve to compact the clay particles around said mandrels to form clay pipe having a monolithic spur, and means for removing said formed pipe and second mandrel out of said cavity.

2. Apparatus for making clay pipe having a monolithic spur according to claim 1 wherein said second mandrel spans said cavity and is in contact with the inner bore of said elastomeric sleeve.

3. Apparatus for making clay pipe having a monolithic spur according to claim 1 wherein magnets are embedded in said second mandrel to affix it to said upright mandrel.

4. Apparatus for making clay pipe having a monolithic spur according to claim 1 wherein the axis of said upright mandrel is normal to the axis of said second mandrel.

References Cited
UNITED STATES PATENTS

| | | | |
|---|---|---|---|
| 3,128,501 | 4/1964 | Borah. | |
| 3,193,900 | 7/1965 | Wendt | 25—31 |
| 3,200,442 | 8/1965 | Haller | 264—314X |
| 3,239,591 | 3/1966 | Wendt | 264—314 |
| 3,439,732 | 4/1969 | Andreoli. | |
| 3,454,997 | 7/1969 | Ligon | 25—30 |

J. SPENCER OVERHOLSER, Primary Examiner

B. D. TOBOR, Assistant Examiner

U.S. Cl. X.R.

25—30, 127; 264—314